(12) United States Patent
Mathew et al.

(10) Patent No.: US 11,977,460 B1
(45) Date of Patent: May 7, 2024

(54) FILE SYSTEM NAMESPACE RECONSTRUCTION

(71) Applicant: Dell Products L.P., Round Rock, TX (US)

(72) Inventors: George Mathew, Belmont, CA (US); Srisailendra Yallapragada, Cupertino, CA (US); Murthy Mamidi, Queen Creek, AZ (US); Keyur Desai, Cary, NC (US); Dhawal Bhagwat, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/175,682

(22) Filed: Feb. 28, 2023

(51) Int. Cl.
| | |
|---|---|
| *G06F 7/00* | (2006.01) |
| *G06F 11/14* | (2006.01) |
| *G06F 16/11* | (2019.01) |
| *G06F 16/13* | (2019.01) |
| *G06F 16/174* | (2019.01) |
| *G06F 16/182* | (2019.01) |
| *G06F 16/185* | (2019.01) |

(52) U.S. Cl.
CPC ........ *G06F 11/1469* (2013.01); *G06F 16/128* (2019.01); *G06F 16/137* (2019.01); *G06F 16/1748* (2019.01); *G06F 16/182* (2019.01); *G06F 16/185* (2019.01); *G06F 2201/84* (2013.01)

(58) Field of Classification Search
CPC .. G06F 16/116; G06F 16/137; G06F 16/1748; G06F 16/185; G06F 16/1727; G06F 16/172; G06F 16/184; G06F 16/955; G06F 16/24; G06F 16/21; G06F 11/1464; G06F 11/1453; G06F 11/32; G06F 11/3079; G06F 11/3442; G06F 11/3409; G06F 2201/83; G06F 2201/84
See application file for complete search history.

(56) References Cited

U.S. PATENT DOCUMENTS

| | | | | |
|---|---|---|---|---|
| 8,805,967 | B2 * | 8/2014 | Taylor | G06F 11/2097 709/219 |
| 10,223,377 | B1 * | 3/2019 | Moghe | G06F 16/185 |
| 2014/0330787 | A1 * | 11/2014 | Modukuri | G06F 11/2056 707/659 |
| 2022/0083432 | A1 * | 3/2022 | Mondal | G06F 11/1453 |

* cited by examiner

*Primary Examiner* — Mohammad A Sana
(74) *Attorney, Agent, or Firm* — Dergosits & Noah LLP; Todd A. Noah (57) ABSTRACT

Systems and methods for reconstructing a namespace in response to a loss of data are described herein. To reconstruct the namespace, metadata super segments within a set of file containers may be located in response to a determination that original namespace metadata associated with files stored within the containers is unreadable. Content handles linking the super segment to metadata for each of the files may then be reconstructed from the super segments. Both inode numbers and M-tree identifiers are also extracted from the super segments for each of the files referenced by the super segments. Then, a plurality of U-trees is assembled by aggregating and linking the inode numbers of the files referenced within the super segments based on the M-tree identifiers. Finally, the recovered namespace metadata tree data structure for all of the files within the plurality of LP containers is assembled by aggregating and linking the U-trees.

20 Claims, 8 Drawing Sheets

FILE SYSTEM NAMESPACE RECONSTRUCTION

TECHNICAL FIELD

This disclosure relates to storing digital information, and more particularly, to reconstructing a namespace in response to a loss of data.

BACKGROUND

In computer programing, a namespace can be a set of identifiers (known as names) that are used to refer to distinct types of objects while avoiding identifier collision between multiple objects that use the same identifier. Namespaces are commonly structured as hierarchies to allow reuse of identifiers in different contexts, which ensures that all of a given set of objects have unique identifiers so that each object can be easily identified. For example, within the namespace of a family named Smith, the given name John is sufficient to uniquely identify a person named John Smith even though people who have other family names may also have the given name John. Prominent examples for namespaces include file systems, which assign names to files, and hierarchical file systems which organize files in directories, so that each directory is a separate namespace, such that the directory "letters" and the directory "invoices" may both include a file named "to_jane". A namespace may be stored in distinct types of data structures.

A namespace's set of identifiers that are used to refer to distinct types of objects may include index nodes, which may be referred to as inodes. An inode can be a data structure in a Unix-style file system that describes a file-system object, such as a data file or a directory. All objects will have corresponding inode entries and metadata. Each inode stores the attributes and disk block locations of an object's data. File-system object attributes may include metadata, such as times of last change and access, snapshot identifier, and owner and permission data. A directory may be a list of inodes with their assigned names, with the list including an entry for itself, its parent, and each of its children.

A namespace may be stored in a B-tree, which can be a self-balancing computer data structure that maintains sorted data and allows searches, sequential access, insertions, and deletions in logarithmic time. The B-tree generalizes the binary search tree, allowing for nodes with more than two children. Unlike other self-balancing binary search trees, the B-tree is well suited for storage systems that read and write relatively large blocks of data, such as disks. The term B-tree may refer to a specific design or to a general class of designs. In the specific design sense, a B-tree stores keys in its internal nodes but does not need to store those keys in the records at the leaves.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

Recently, with the size of the file systems having scaled into petabytes or several multiples of petabytes, security concerns around data sensitivity have become paramount. A disturbing trend becoming increasingly prevalent is total malicious destruction of data. Despite the tremendous care and investments that data centers tend to invest in data security and loss prevention, such malicious intrusions do occur often leading to not just disruptions in service but resulting in significant loss of data. There may be several ways to prevent total loss of data, such as isolation, replication, and other means. Of the content stored in the storage systems, metadata is much more critical than the corresponding data itself because a small amount of metadata, such as the namespace of the file system, could impact vast amounts of data. In most cases, the recovery of a reasonable amount of meta data could ensure almost complete recovery of the impacted data.

Embodiments described herein present a mechanism to withstand such a significant metadata destruction attempt and be able to recover as much of the impacted data as possible. Even though most of the file system metadata, such as the block set can be rebuilt, the filesystem is unable to recover the files if the namespace and the inodes are lost. By reconstructing the namespace of intact data of the file system, such data can be accessible by the conventional file access methods. While examples herein are discussed using Data Domain File System™ (DDFS) provided by Dell EMC™ Corporation (Dell EMC) as an example, the systems and methods of namespace reconstruction described herein are applicable to any Merkle tree-based file system namespace.

As described herein, an inode can be a data structure in a Unix-style file system that describes a file-system object, such as a data file or a directory. Each inode stores the attributes and disk block locations of an object's data. File-system object attributes may include metadata, such as times of last change and access, as well as owner and permission data. A directory may be a list of inodes with their assigned names, with the list including an entry for itself, its parent, and each of its children.

Exemplary Environments

Figure 1:
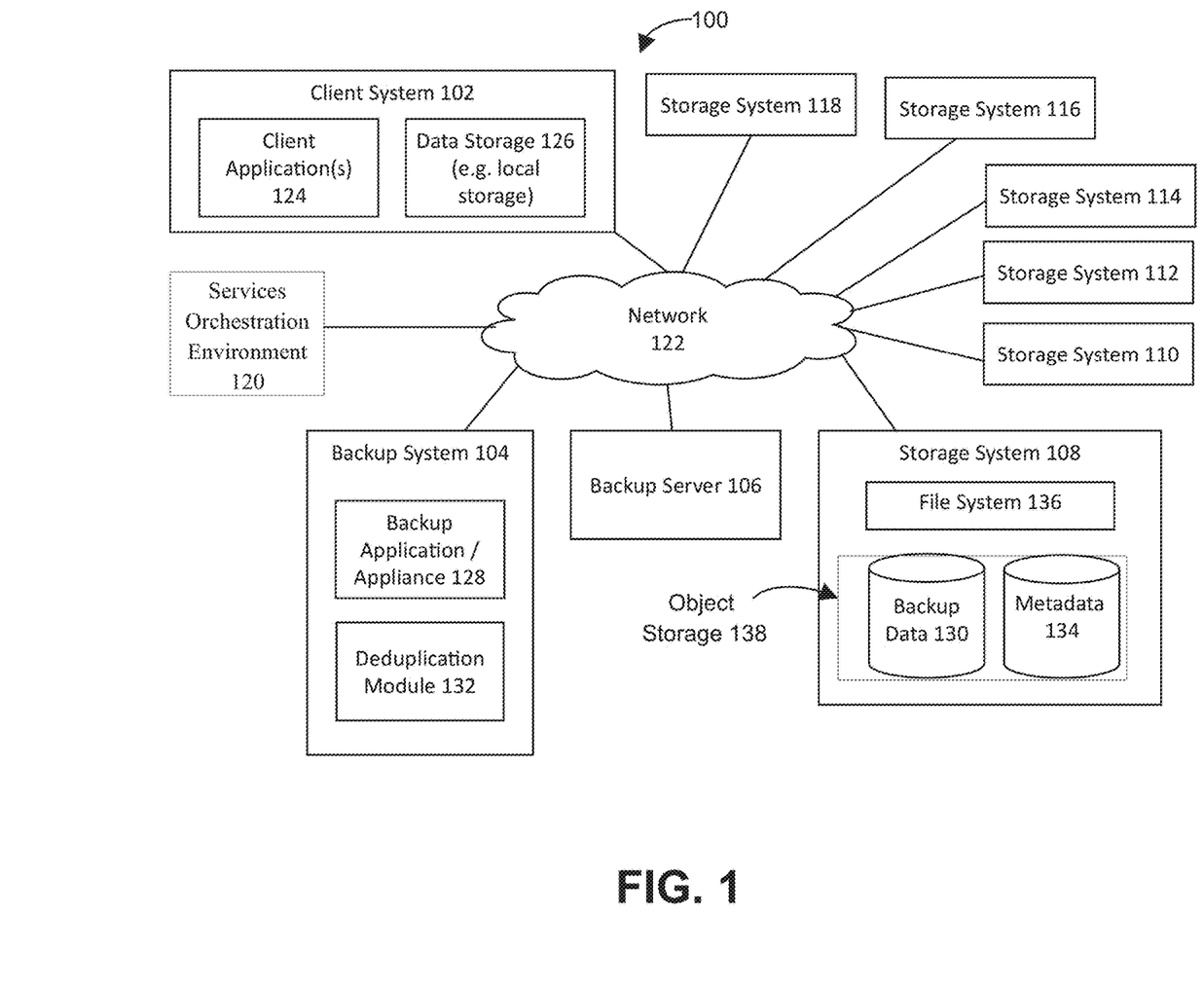
FIG. 1 is a block diagram illustrating an example operating environment for reconstructing a namespace in response to a loss of data according to one or more embodiments of the disclosure.

More specifically, and with reference to FIG. 1, shown is a block diagram illustrating an example of an operating environment 100 for distributing phases of namespace replication of tags in global scale systems within a clustered storage environment according to one or more embodiments of the disclosure. As shown, the operating environment 100 may include a client system 102, a backup system 104, a backup server 106, a cluster of storage systems 108-118, and a services orchestration environment 120, which may interact via a network 122, which may be any type of wired or wireless network including a local area network (LAN), a wide area network (WAN), or a direct communication link, or other suitable connection.

As shown, the operating environment 100 may include a client or client system (or computer, or device) 102 that may be associated with a client or customer of a data backup and protection service, and the backup system 104 that may be associated with a data backup and protection service provider. For example, the client system 102 may provide computing resources (such as databases) for users (such as website visitors) of the customer, and data which may be protected by the backup and data protection service provider. Accordingly, the client system 102 may function as a client from which backups are performed. In some embodiments, the client system 102 may comprise a virtual machine.

In addition, the client system 102 may host one or more client applications 124, and may include data storage 126, as well as an interface for communicating with other systems and devices, such as the backup system 104. In general, the client applications 124 may create new and/or modified data that is desired to be protected. As such, the client system 102 is an example of a host device. The data storage 126 may be used to store client data, which may, along with the client system 102 (such as the client applications 124), be backed up using the backup system 104.

As further described herein, components of the client system 102 (such as the client applications 124 and the data storage 126) may be a data source, or be associated with one or more data sources such as a database, a virtual machine, and a storage device. In addition, components of the client system 102 may be data sources that are associated with the client system 102, but these components may reside on separate servers, such as a data server, or a cloud-computing infrastructure. The client system 102 may include a backup client application, or plug-in application, or Application Programming Interface (API) that cooperates with the backup system 104 to create backups of client data. The backed-up data can also be restored to the client system 102.

In at least one embodiment, the backup system 104 may represent one or more components of a Data Domain Restorer-based deduplication storage system, and a backup server 106 may be implemented in conjunction with a Data Domain deduplication storage server provided by Dell EMC for use with Data Domain Restorer storage devices. For example, the backup server 106 may be a stand-alone entity, or may be an element of the cluster of storage systems 108-118. In some embodiments, the backup server 106 may be a Dell EMC Avamar server or a Dell EMC Networker server, although no particular server is required, and other backup and storage system configurations are contemplated.

The backup system 104 may include a backup application (or appliance) 128 that performs, manages, or coordinates the creation and restoration of data that may be backed-up. For example, data to be backed-up from the client system 102 may be communicated from the client system 102 to the backup application 128 for initial processing, after which the processed data, such as backup data 130, is uploaded from the backup application 128 for storage at the cluster of storage systems 108-118. In some embodiments, the backup application 128 may cooperate with a backup client application of the client system 102 to back up client data to the cluster of storage systems 108-118. The backup application 128 may also cooperate with a backup client application to restore backup data from the cluster of storage systems 108-118 to the client system 102.

In some embodiments, the backup application 128 may be a part of, or work in conjunction with, a storage appliance. For example, the storage appliance may include a Dell EMC Cloud Boost appliance, although any suitable appliance is contemplated. In addition, the backup application 128 may provide a variety of useful functionalities such as source-side data deduplication, data compression, and WAN optimization boost performance and throughput, while also possibly reducing the consumption and cost of network bandwidth and cloud storage capacity.

One, some, or all, of these functions of the backup application 128 may be performed using deduplication logic via a deduplication module 132. For example, the deduplication module 132 can provide data segmentation, as well as in-flight encryption as the data is sent by the backup application 128 to the cluster of storage systems 108-118. However, as further described herein, in some embodiments, data deduplication may be performed entirely within the cluster of storage systems 108-118. It should be noted that the backup application (or storage appliance) 128 may be implemented in various forms, such as a virtual, physical, or native public cloud appliance to fit the requirements of a particular configuration, and the backup application 128 may be used with distinct types of data protection environments, including public and private object storage clouds.

The storage system 108, which is substantially similar to the storage systems 110-118, may store backup data 130 (backup files or backup objects) within a one or more computer nodes, as further described herein. As shown, the storage system 108 may also store metadata 134 for (or associated with) the backup data 130, and one or more instances of a filesystem 136 that catalogs backup files and other data residing in the clustered environment. In general, the storage of the backup data 130 may be configured to store data backups for the client system 102, which may be restored in the event of a loss of data.

In some embodiments, such a system may be provided within an operating environment. In general, embodiments of the disclosure may include and/or be implemented in an operating environment that includes a services orchestration environment, and that may include a data protection operating environment which includes a backup and clustered storage environment. For example, at least some functionality may be provided by, or implemented in connection with, various platforms for data protection platform provided by Dell EMC, and associated systems, methods, and components, although use of this particular platform is provided only by way of illustration and is not required.

In some embodiments, the services orchestration environment may take the form of a cloud environment. However, in some embodiments the services orchestration environment may be implemented in an on-premises environment, and/or hybrid environments that include public and private elements. In addition, the services orchestration environment and/or operating environment may take the form of an environment that is partly, or completely, virtualized. The operating environment may include one or more host devices that each host one or more applications used by a client in the operating environments.

As such, a particular client may employ, or otherwise be associated with, one or more instances of each of one or more applications. In general, the applications employed by the clients are not limited to any particular functionality or type of functionality. Some example applications may include database applications such as a SQL Server, filesystems, as well as other types of data stores. The applications on the clients may create new and/or modify existing data, which is data to be protected.

Any of the devices, including the clients, servers, and hosts, in the operating environment can take the form of software, physical machines, or virtual machines, or any combination thereof, though no particular device implementation or configuration is required for any embodiment. Similarly, data protection system components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Namespace Organization

Figure 2:
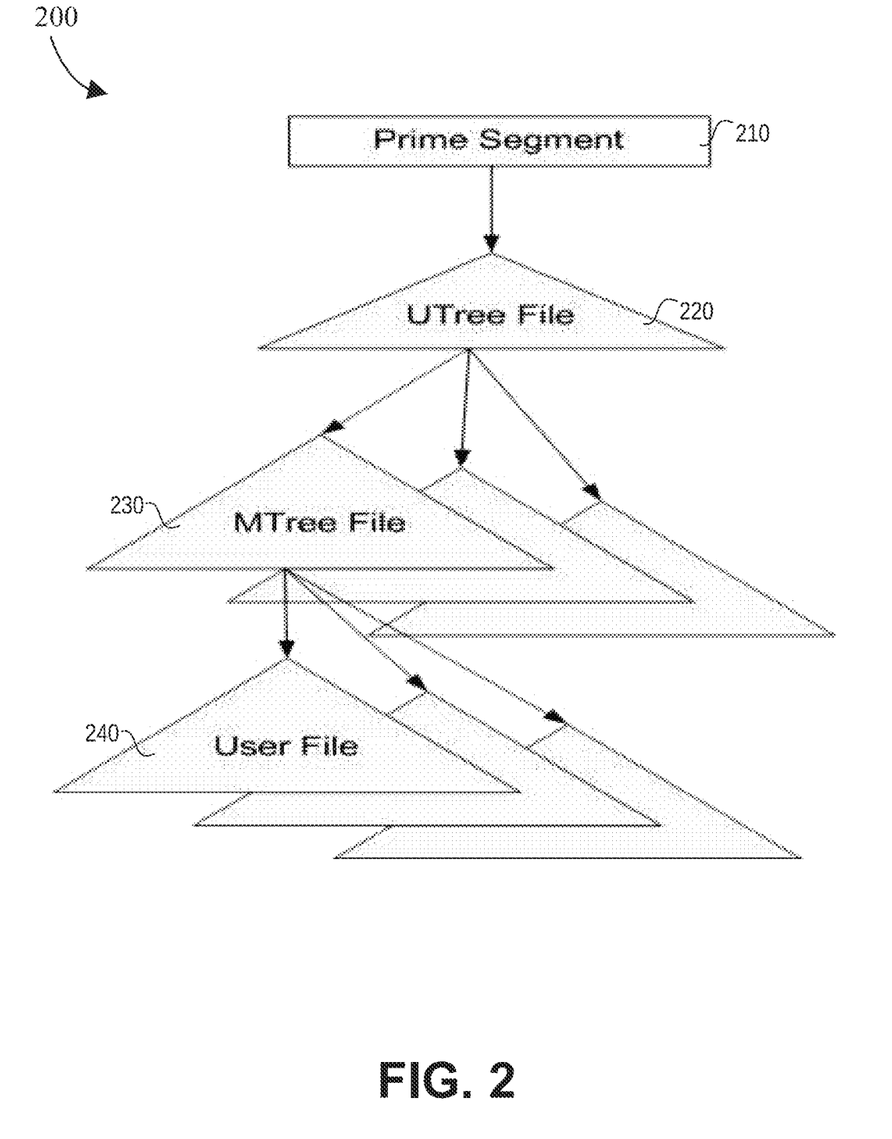
FIG. 2 is a block diagram illustrating an exemplary file system namespace layout according to one or more embodiments of the disclosure.

In some file systems, such as DDFS, file sets called M-trees may be used to partition the file system namespace. M-trees are mountable and independently manageable self-contained file sets. FIG. 2 is a block diagram illustrating an exemplary file system namespace layout 200 according to one or more embodiments of the disclosure. As seen in exemplary namespace 200, each M-tree 230 includes a plurality of user file metadata files 240 (also referred to herein as inodes). M-trees 230 may be combined together into a larger namespace structure called U-tree 220 to present a composite file system. The M-trees as well as the U-tree may be implemented using a tree structure for indexing the namespace records. A namespace metadata tree contains the serialized image of the name space hierarchy of conventional file system constructs such as directories, files, and their attributes. U-tree is not a user-managed object in some embodiments; only M-trees may be exposed for user in such cases. The M-tree may also support various policy settings such as snapshot schedule, replication policy, "Write Once Read Many" policies, quotas, and tiering policies. The set of files in an M-tree may be organized as a conventional hierarchical file system namespace such that an M-tree corresponds to both a directory and all files (and directories) within the namespace rooted at the directory. The namespace for the U-tree may accordingly be expressed as a flat directory, where the root node of the directory corresponds to the U-tree, and each M-tree is a file node within the directory. A separate metadata tree structure may be allocated for the U-tree and each of its child M-trees in the namespace. The prime segment 210 stored in a file container may include the content handle of the U-tree. The content of a file (data) may be represented by a structure called the content handle.

Each file system node may include manageable file sets (such as the M-trees), which are practically standalone file systems inside a larger file system that encloses them. As many as 256 separate file sets can exist in each instance of a file system. A file set may be a set of files which is self-contained, and each file set can function as a mount point.

Figure 3:
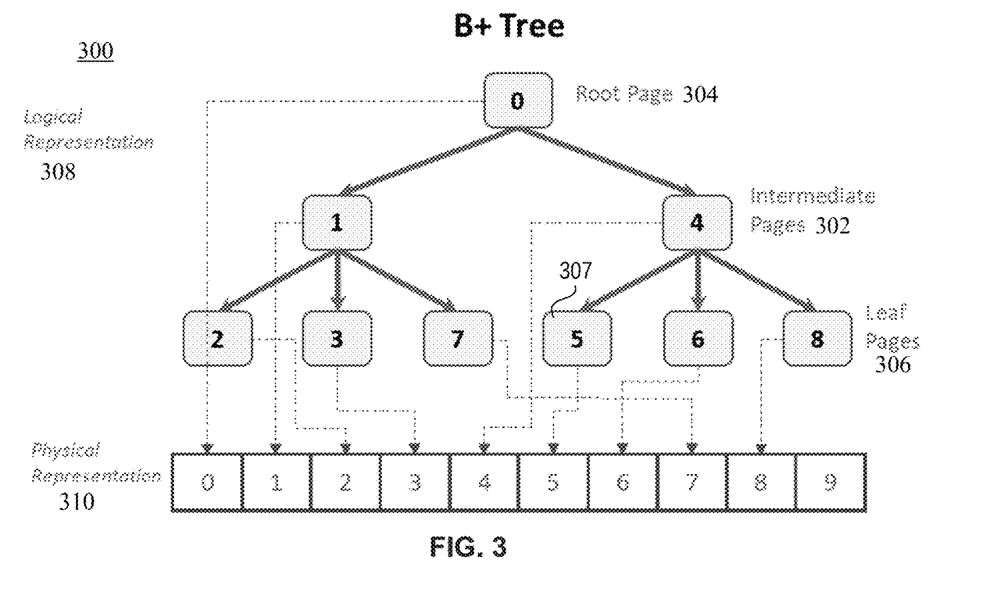
FIG. 3 is a block diagram illustrating an example data structure for a namespace metadata tree according to one or more embodiments of the disclosure.

FIG. 3 is a block diagram illustrating an example data structure for a namespace metadata tree 300 (also referred to as a B+ tree in the exemplary embodiment shown in FIG. 3) according to one or more embodiments of the disclosure. File sets may be represented internally as a B+ tree with 3 intermediate levels, but for simplicity the example B+ tree 300 in FIG. 3 depicts a single intermediate level of intermediate pages 302 between the root page 304 and the leaf pages 306. A B+ tree may be defined as a balanced tree of fixed depth and may advantageously store data for efficient retrieval in a block-oriented storage context, particularly for file systems. This greater efficiency than binary search trees is primarily because B+ trees have high fanout, which is the number of pointers to child nodes in a node, typically about 100 or more, with the high fanout reducing the number of input/output (I/O) operations required to find an element in the tree.

Granular replication performs operations on file sets' underlying data structure, the B+ tree, which can be defined as a balanced data structure of fixed depth. Each node in the B+ Tree may be a fixed size "page" of 64 kilobytes (KB). Pages can refer to each other via a page number, such as pages numbered 0-9 in physical representation 310. A logical representation 308 of a B+ tree may be physically represented 310 as a linear area of pages which is stored in persistent storage such as a disk. Since the B+ tree in flattened form is essentially just a single linearly addressed segment of space, the B+ tree may be traversed quickly for certain operations.

The actual file metadata (e.g., the inode) may be contained in a B+ tree leaf page 306. The leaf page itself can contain key/value pairs. A key may be a 128-bit number kept in sorted order in the leaf page, and accompanied by a value, which may be an index to data associated with the key. The 128-bit key may be composed of a 64-bit parent file identifier (PID), and 64-bit child file identifier (CID), which may be the inode number of the actual file. The placement of the keys for a file may be a relevant consideration in this design.

Figure 4:
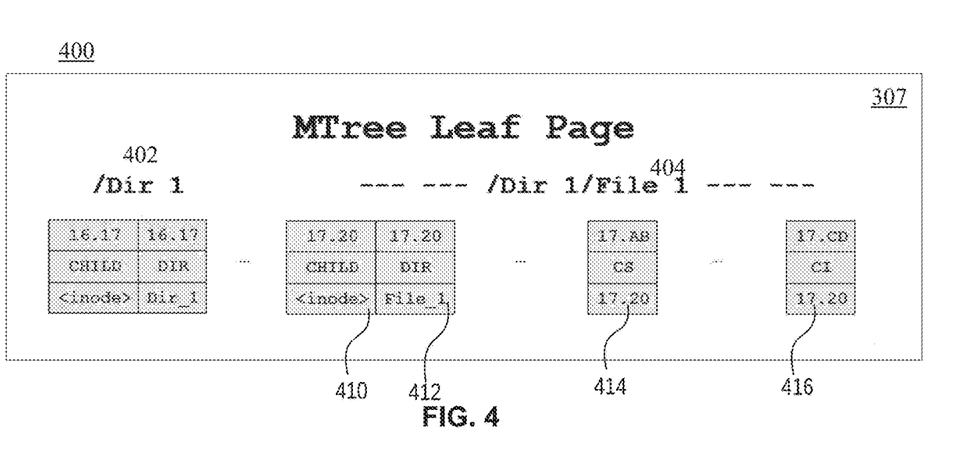
FIG. 4 is a block diagram illustrating an example inode/namespace metadata tree leaf page according to one or more embodiments of the disclosure.

FIG. 4 is a block diagram 400 illustrating an example inode/namespace metadata tree leaf page 307 (also seen in B+ Tree 300) according to one or more embodiments of the disclosure. Directory information 402 for the file referenced in the leaf page 407 is included. In the Data Domain operating system 5.7 and later shown in diagram 400, four keys are created for each file, such as file 404 named File 1. The four keys include the CHILD key 410, which may contain inode type information including the placement hint tag, and a DIRENT key 412, which may contain a file's name, and two hash keys 414 and 416. The CS_HASH key can contain a hash of the file's name in a case-sensitive way, and the CI_HASH key can contain a case-insensitive hash of the same file's name. Given that the placement hint tag is contained in the CHILD key, which is encoded pid:cid, this CHILD key can be used to filter the other pid:cid keys. Those keys which are in PID:hash format will be located elsewhere in the B+ tree for a given file. When a directory and its files are created in sequence the keys for those entities line up sequentially in the M-tree Leaf Page. This means that the lookup proceeds expeditiously since all the data is already in memory. Over time, however, directories may become fragmented due to file creations and deletions and thus multiple leaf pages will need to be loaded to lookup a single file. In the example in B+ Tree 300, the same set of keys shown above have been spread over three leaf pages with non-sequential page numbers pertaining to intermediate page 302.

Data and Metadata Relation

Figure 5:
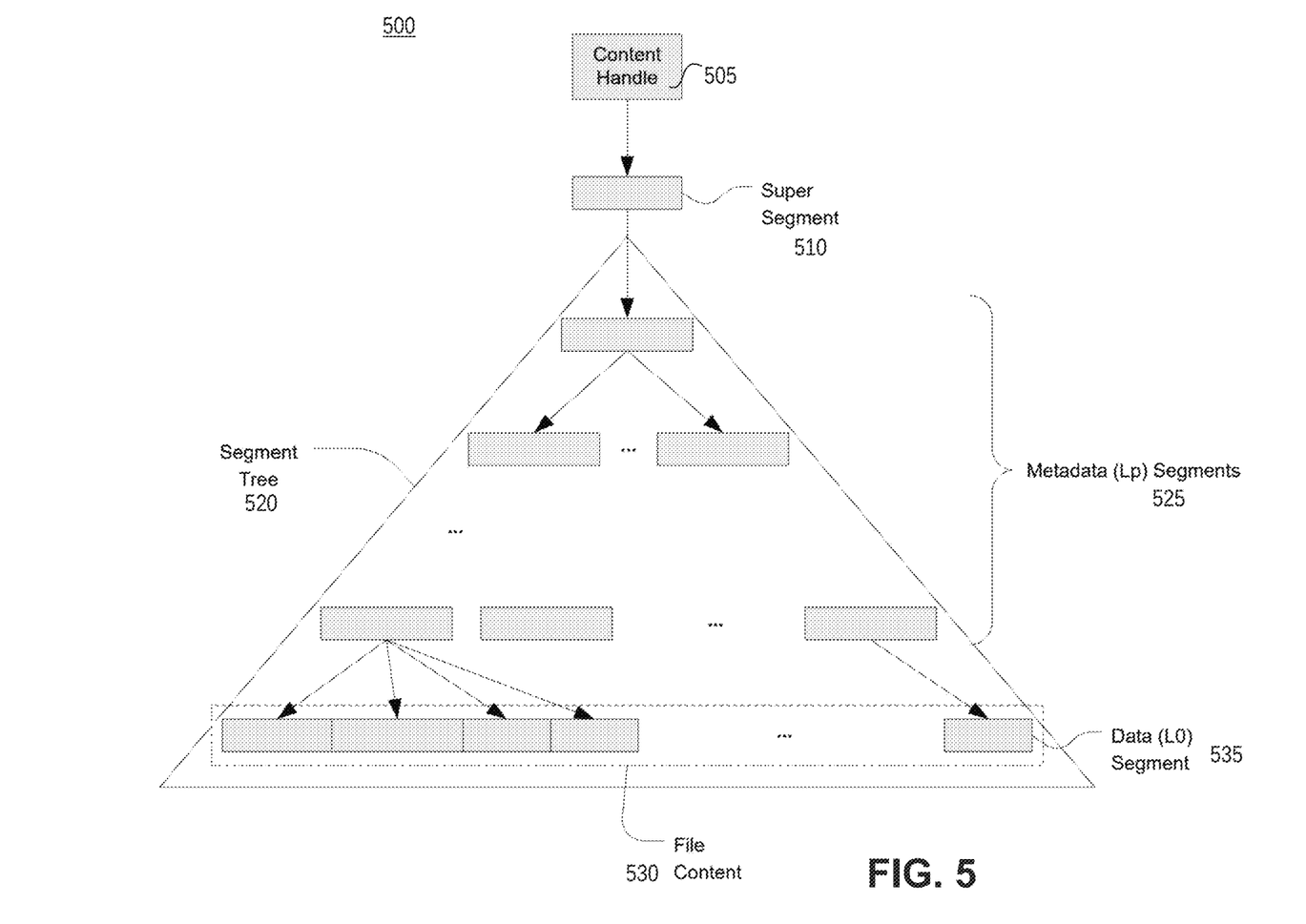
FIG. 5 is a block diagram illustrating a segment tree for a stored file that maps individual stored segments according to one or more embodiments of the disclosure.

FIG. 5 is a block diagram illustrating a segment tree 500 for a stored file that maps individual stored segments according to one or more embodiments of the disclosure. The content of a file is linked to the file metadata by a structure called the content handle 505. The content handle 505 of each file may be a pointer linking an original inode entry in the namespace metadata for a file and the corresponding super segment in the data containers. A segment tree 520 may be maintained for each file that maps from the file address space into the data segments 535 of the file stored in the containers. The super segment (L6 segment) 510 for a given file holds the segment reference to the root (the top segment) of the segment tree 520 for the file. This super segment 510 is linked (by, for example, a pointer) to the content handle 505 of the file and is accordingly the corresponding super segment to content handle 505. The leaf segments in a segment tree (e.g., the B+ Tree 300) may correspond to the file segments 535. These segments are called data segments or L0 segments. Non-leaf segments may be referred to as metadata segments 525 or Lp segments and may include an array of segment references linked to the data segments 535, where each metadata segment 525 includes a reference to one or more data segments 535, as shown.

Figure 6:
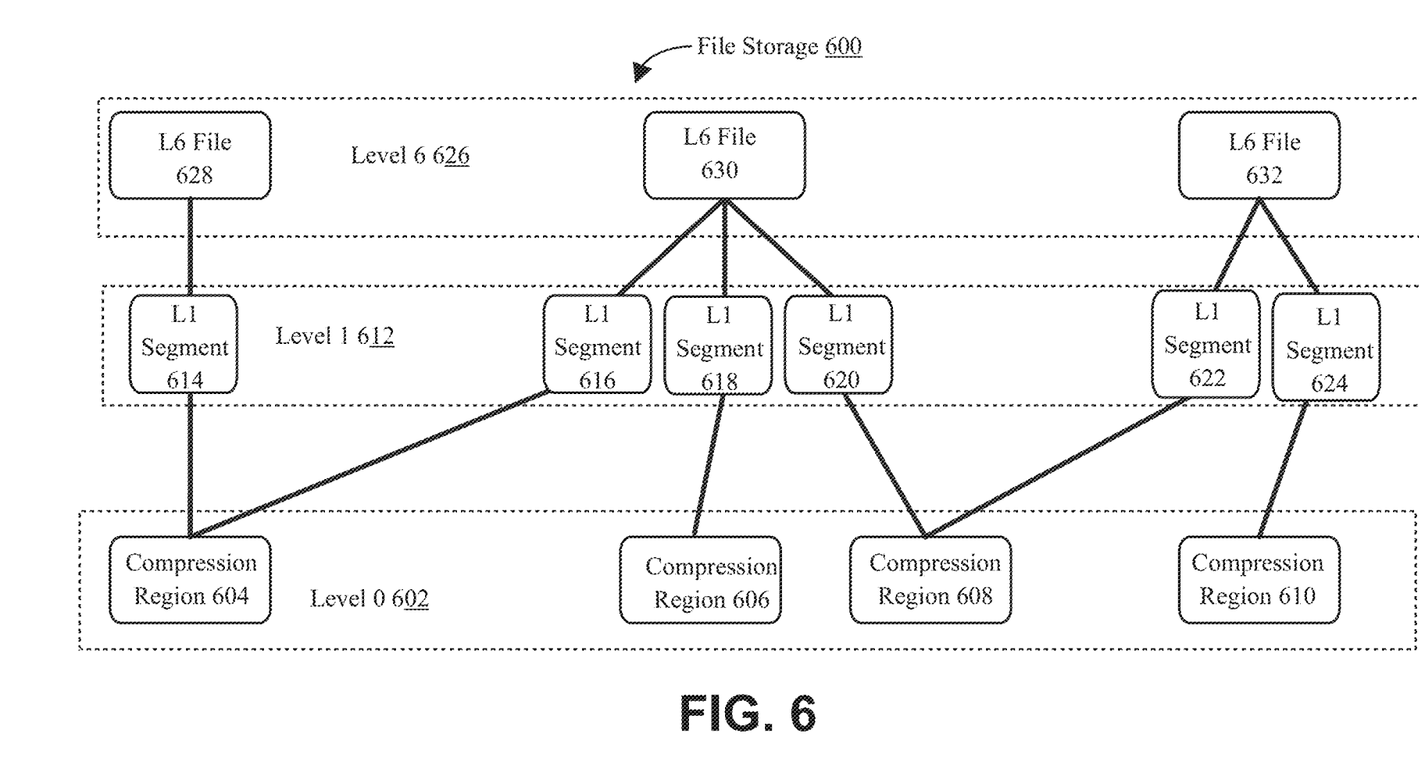
FIG. 6 is a block diagram illustrating relationships between L6 files or objects, L1 segments, and L0 compression regions according to one or more embodiments of the disclosure.

FIG. 6 depicts an exemplary segment tree in storage. A portion of the file storage 600 may be represented by Level 0 602, which may include compression regions 604-610. Each compression region may store unique data segments that have been compressed and each compressed data segment's corresponding unique fingerprint and data segment size.

A data file or data object may be represented by a Merkle tree with the bottom level of the Merkle tree representing the data segments, which may be referred to as level 0 data segments or L0 data segments. Large numbers of sequential fingerprints, such as 20-byte SHA-1 hash fingerprints, generated for sequential data segments, may be grouped together at the next higher level of the Merkle tree to form groups of fingerprints for data segments, which may be referred to as a level 1 segment or a L1 segment. The fingerprints of the groups of data segments that form L1 segments may be grouped together as a level 2 fingerprints for data segment or a L2 segment, and this process of grouping fingerprints for increasingly larger groups of data segments may continue up to level 6 or L6, which represents the entire data file or data object.

The top of a Merkle tree is referred to as an L6 file or object, even though it may actually refer to fingerprints for groups of data segments in a lower numbered level. Fingerprints for segments which are above L0 may be referred to as LP segments. While multiple L0 data segments may be compressed into 64-kilobyte (KB) to 128 KB sized compression regions, LP segments are not compressed because fingerprints, such as 20-byte SHA-1 hash fingerprints, are quite random and do not compress well.

Since either a sequence of a file's data segments or a sequence of the data segments' fingerprints may be used for forming a L1 segment and/or determining a similarity group identifier, a source can communicate these fingerprints without communicating these data segments when L1 segments are to be formed and similarity group identifiers are to be determined. A similarity group identifier may be used to route a L1 segment to a back-end service that is uniquely responsible for each L1 segment which has a similarity group identifier that is within a range of similarity group identifiers.

FIG. 6 depicts that a portion of the file storage 600 may be represented by Level 1 612, which may include L1 segments 614-624. Each L1 segment may store metadata that identifies the data object or data file to which a particular L1 segment belongs, a reference to a similarity group identifier, and a fingerprint array that stores those fingerprints included in a L1 segment and the sizes of each data segment represented by each fingerprint. FIG. 6 depicts that a portion of the file storage 228 or the object storage 228 may be represented by Level 6 626, which may include L6 files 628-632. Each data file or data object has a corresponding L6 file or object, which may reference the one or more L1 segments associated with the data object or data file, since the associated L1 segments are based on an array of fingerprints of the data segments which comprise the data object or data file.

Deduplication happens when different data files or data objects refer to the same L0 data segments and LP segments. For example, if two data files are exactly the same, they would have the same L6 fingerprints. However, if two data files only partially overlap in their data, then some branches of the Merkle tree will be identical, with the same LP fingerprints and the same L0 data segments, while other branches of the Merkle tree will be different, with different LP fingerprints and different L0 data segments.

For a system with a single node, a L1 segment may be formed based on fixed offsets within data objects or data files, regardless of data segment boundaries. Since L1 segments are all processed within a single back-end node, such a formation may have insignificant impact on overall deduplication ratios, despite the partial data segments which may occur at the ends and the beginnings of the groups of data segments that form L1 segments. For a system with multiple back-end nodes, a L1 segment may be formed by evaluating a feature value (such as a hash of the first 64 bytes) of each data segment for forming the L1 segment until the feature value of one of the data segments satisfies criteria for forming a group of data segments, such as by the first data segment which has a feature value that matches a bit pattern mask. For example, a data segment which has the feature value that matches the bit pattern mask will serve as a boundary between where the data segments end for forming the current L1 segment and the data segments begin for forming the next L1 segment, which typically results in the L1 segments storing fingerprints for groups of data segments that range from 0.5 MB to 2.0 MB.

Then a feature value for a data segment for forming a L1 segment (such as a hash of the first 64 bytes of the first data segment for forming a L1 segment) may be used as the basis for determining a similarity group identifier to route the L1 segment to the appropriate back-end service. Using a hash of a representative portion of a data segment can result in L1 segments for data that are similar, but not identical, being routed to the same back-end service. The net effect of such routing may be to improve deduplication while increasing skew. Using a feature value for the first data segment for forming a L1 segment has the advantage that it is not necessary to buffer all data segments for forming a group of data segments that form a L1 segment before deciding where to route the L1 segment, something that matters when hundreds or thousands of data segments are being processed simultaneously. Collisions are acceptable when using a hash function for routing L1 segments rather than using a hash function for deduplication, so a system can base a similarity group identifier on the first 32-bit word of a 20-byte SHA-1 hash for the first 64 bytes in the first data segment in a group of data segments that form a L1 segment.

Figure 7:
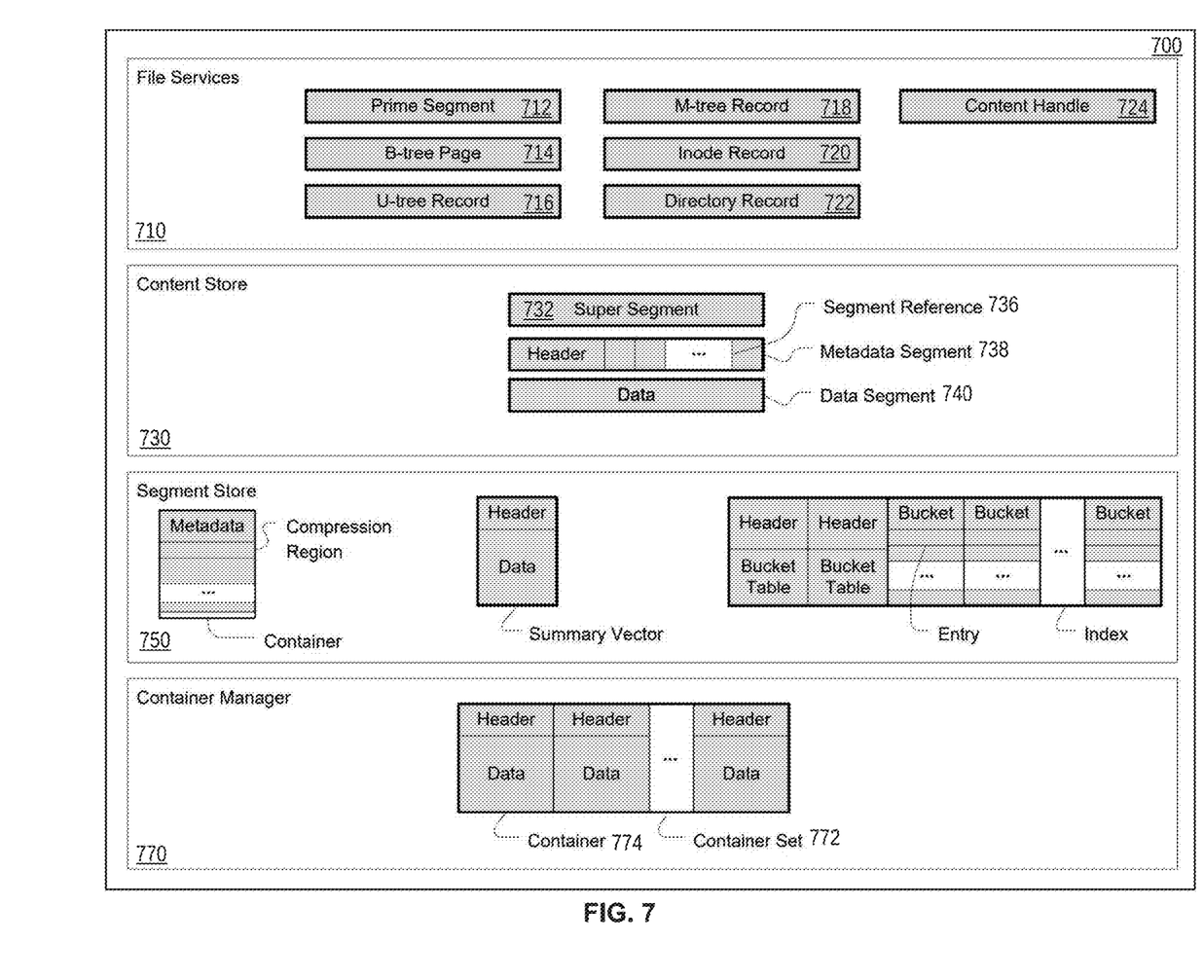
FIG. 7 is a block diagram illustrating an example data path stack from namespace to storage container according to one or more embodiments of the disclosure.

FIG. 7 is a block diagram illustrating an example data path stack 700 from namespace level 710 to storage container level 770 according to one or more embodiments of the disclosure. The file system data path stack 700 may be a process within a larger operating system, in some embodiments. Content Store (CS) 730 can be considered as a store of a (flat) collection of byte streams. A CS stream may correspond to the content of a conventional file or a backup image of an entire volume or a tape cartridge. In CS, the streams may be identifiable by their content. A user of CS 730 (e.g., a File Manager) needs to supply the content handle 724 for a given stream to access the content via the super segment 732, as noted above. For each file, the super segment 732 may be linked to the metadata segments 738, which are associated with data segments as discussed with respect to FIG. 5. The content handles 724 may be persisted as a file attribute in the namespace 710.

The namespace of the file system (referred to as file services 710) may also be stored and accessed via a byte stream and therefore there is a segment tree for the namespace having a prime segment 712 as its root node. The B-tree pages 714 for the U-tree record 716 and its M-trees 718 are stored in a single CS stream. A separate CS stream may be created for each snapshot of the namespace. The prime segment 712 is the object that has the content handle for the segment tree of the namespace 710, which has content handles 724 (stored in some of its data segments) for the segment trees of the files in the namespace. The prime segment 712 holds the content handle of the U-tree.

The content handles 724 for the data files are stored in the namespace as file attributes. The namespace records are stored on a level-by-level basis, starting with the root B-tree pageattributes 714. Descending down the B-tree, there are utree page attributes 716 and M-tree page attributes 718. At the lowest levels there are individual segment attributes, which are stored in the namespace as inode record attributes 720, and directory record attributes 722. Each inode record 720 for a file further contains reference to content handle 724 of the file, which provides a CS 730 reference to the data for the file. Hence, by recovering content handle 724 of a file, the file inode 720 may be reconstructed, allowing data recovery even in scenarios where the entire namespace 710 has been corrupted and is unreadable. This process is further described below in reference to FIG. 8.

Returning to data path stack 700, Segment Store (SS) 750 provides interfaces to store and retrieve segments. The filesystem data is chunked into various segments, as discussed above. Segments are compressed (and encrypted if configured) at the SS 750 level before being packed into file containers. Container Manager (CM) 770 implements an append-only container log called a container set 772. CM 770 may provide interfaces to append, retrieve, and delete individual containers 774 within the container set 772 for a group of stored files.

The relation between file data and metadata in the namespace can be summarized as follows:
- Some containers 774 (which hold segments of file data for a plurality of files) within a container set 772, contains references to the L6 super segments 732 of the files.
- Each L6 super segment 732 contains reference to a file handle structure, which holds the M-tree identifier ("mid") and inode number for the metadata of the file. Data from the L6 super segment 732 can be referenced via a content handle structure 724 within the file's metadata.
- This content handle structure 724 is referenced from the inode structure 720 for each file, which holds reference to the corresponding file namespace metadata tree.

Figure 8:
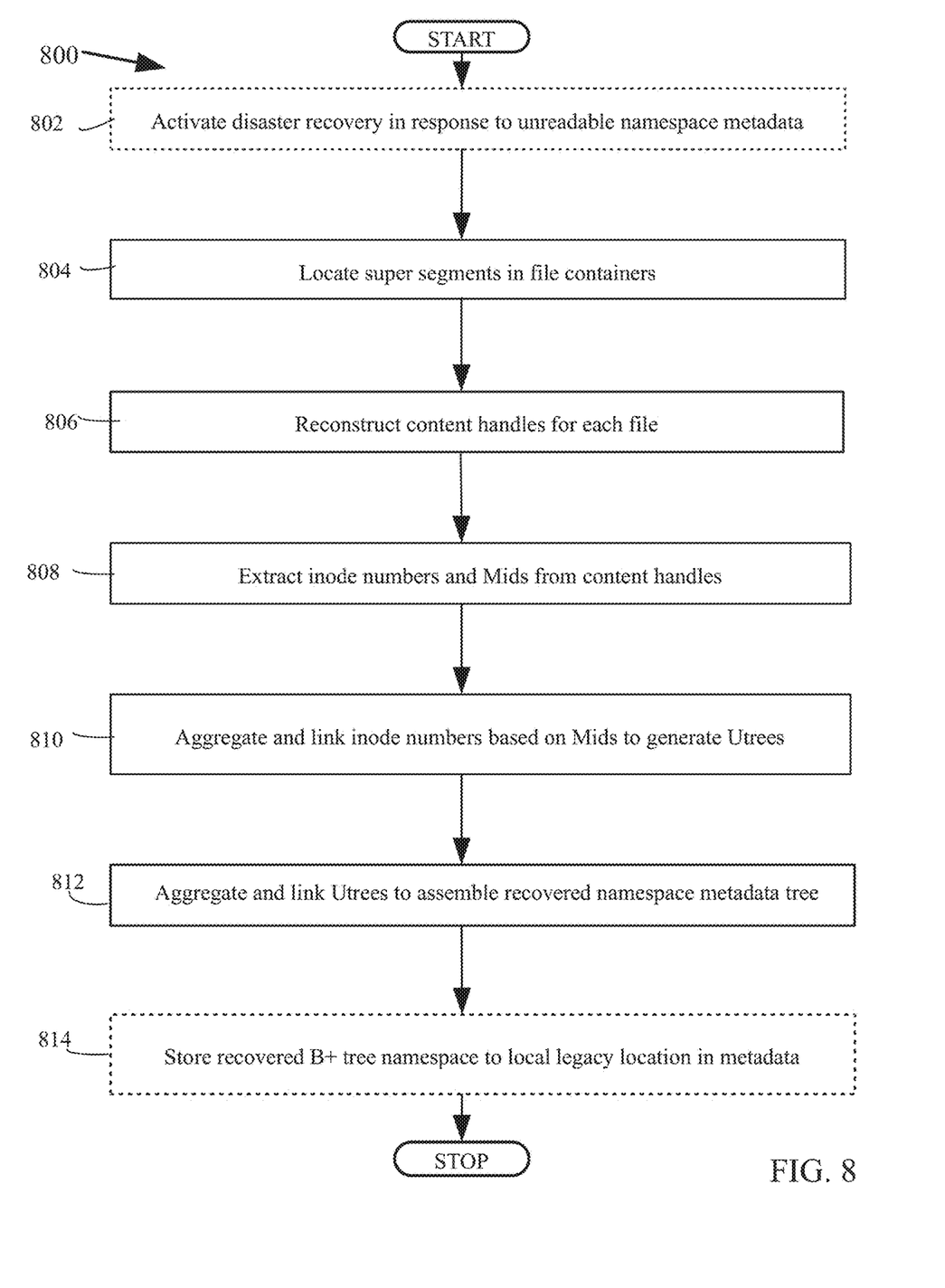
FIG. 8 is a flow diagram illustrating an example method for reconstructing a namespace in response to a loss of data according to one or more embodiments of the disclosure.

FIG. 8 is a flow diagram illustrating an example method 800 for reconstructing a namespace in response to a loss of data according to one or more embodiments of the disclosure. Flowchart 800 illustrates method acts illustrated as flowchart blocks for certain steps involved in the client system 102, the backup system 104, the backup server 106, the clustered storage system 108, and the services orchestration environment 120 of FIG. 1. At step 802, a disaster recovery application, running on a services orchestration environment 120, for example, in environment 100, may be activated in response to detecting unreadable namespace metadata (e.g., the metadata for files stored in file service 710 is unreadable for some reason). Namespace metadata may be defined as set of identifiers that are used to refer to distinct files.

In response to a determination that original namespace metadata associated with files stored within the containers is at least partially unreadable, the disaster recovery application may locate metadata super segments within a set of file containers at step 804. In environment 100, the super segments may be located in backup data 130, for example. The locating may be performed, for example, by the disaster recovery tool or application parsing through each Lp container and identifying the L6 segments. The super segments may clearly labeled as L6 segments, for example, within the data containers, and may be the root segments of a plurality of segments associated with a file (as is shown in segment tree 500, for example). In a sample embodiment, super segments may be represented as a particular data structure (see the cs_super_seg_v0_t structure below). Not all containers may include super segments; however, each file stored among the containers will have a corresponding super segment. Each super segment (e.g., a L6 segment) may be a hash of lower-level segments (e.g., L0 segments) stored in the set of file containers, as described above. A file can be a collection of data stored in a computer's memory or on a storage device under a single identifying name. A segment can be a part into which a file is divided. A container can be a data structure that is a collection of objects, such as file segments.

At step 806, the disaster recovery application may reconstruct the content handles for each of the files referenced within the super segments. This may be done, for example, by creating a pointer to each identified super segment in the set of containers. Each created pointer would serve as the content handle for each file, linking the reconstructed file metadata to the file data in the content store. From the super segments, the disaster recover application may also extract both an inode number and a M-tree identifier for each of the files referenced within the super segments at step 808. As noted above, each L6 super segment contains reference to a file handle structure, which holds the mid and inode number. This file handle structure data may be used to populate each of the file attribute metadata fields for the file for storage in the reconstructed namespace. By repeating steps 806 and 808 for each file in the set of containers, the namespace metadata tree may be reconstructed, one file and directory at a time. Checking may be disabled to restore the file system namespace immediately, or hashes may be reconstructed with the pid and the cid as the names of the directories and files. In embodiments using the latter solution, predetermined hashing rules may be used as part of the aggregating the plurality of generated M-trees into U-trees, so that the reconstructed namespace may pass a hash check verification process. For example, in some embodiments, files may be populated into a reconstructed M-tree by using the pid/cid structure in the discovered file handle, with the pid as name for the parent directory, and cid as name for the file. Any suitable hashing algorithm may be used to reconstruct the hashes for each file and directory, where the hashes are used for checking the namespace structure. For example, if Fowlers Nols Vo (FNV) hashing is used, in the pid/cid case noted a file or directory's checking file hash may be derived as follows:

Pidhash=FNV(pid)
Cidhash=FNV(cid)
Filehash=(Pidhash XOR Cidhash).

However, as noted, it is also possible to reconstruct a M-tree with only inode records and without name hashes in some embodiments.

Once repopulated, the attributes of a file are stored as inode records (such as inode records 720), and aggregated and linked together in a namespace metadata tree data structure at step 810 to generate a plurality of U-trees. Each inode record has a unique inode number and has a reference to the content handle, which points to data/segments that belong to the file. On recovery, the inode number itself may be used to derive the name of the file as a directory entry, along with its hashes used to verify the namespace. Similarly, the directory and sub-directory records may be extracted using the directory inode numbers in the corresponding super segments, and all the child file inode records with their inode numbers may be populated into such directory. The process may be repeated for all files of all M-trees. Furthermore, M-tree super segments stored in the file containers will include U-tree identifiers as their parent ids, allowing the U-tree hierarchy to be reconstructed and child M-tree inode numbers will be populated under each parent U-tree. Finally, the process may be repeated for the root node of the metadata namespace tree data structure based on the U-tree super segments, with the root node having all U-trees as child nodes.

By aggregating and linking the inode numbers of the files and directories, which will have parent directory data stored in super segments in the same manner as individual files, referenced within the super segments based on the M-tree identifiers, the disaster recovery application may generate a plurality of U-trees for the recovered namespace tree at step 810. The mids of the reconstructed M-trees may be used by the disaster recovery application to construct M-tree inodes into each U-tree's hidden/private M-tree directory.

The recovered namespace metadata for all of the files within the plurality of LP containers may then be assembled by aggregating and linking the generated plurality of U-trees at step 812 to reconstruct the prime segment of the entire namespace by repeating the linking process used to recreate the M-Trees. Finally, the complete recovered namespace metadata tree may be restored to the local legacy location at step 814, allowing files to be identified and classified by their metadata in the namespace metadata tree data structure. For example, a request for a file stored within the plurality of containers in backup data 130 may be received from a client system 102 in environment 100. The storage system 108 may retrieve the requested file using the recovered namespace metadata in local legacy location for metadata 134, and may then transmit the requested file to the requesting system 102.

Due to inode versioning in snapshots, multiple L6s of a given file may be located. In this case, the file handle in object in the L6 segment will have snapshot id (sid). In some embodiments, a snapshot could be reconstructed as a whole singular object and stored under the M-tree. In the event of incremental snapshots, the snapshot will have only the files modified in the snapshot but not the unmodified ones. However, a collection of all snapshots of the file system together with the latest snapshot (i.e., the active) will all for the original M-tree to be recovered.

The layout below shows an example simplified filesystem namespace, which contains a single M-tree, one sub-directory that includes one file, and one snapshot (multiple of each of these items stored in the same M-tree are used in varying embodiments):

/mtree1 (mid: 10,)

↳/subdir1 (inode num: 1000)

↳File1.txt (inode num: 1001)

↳/snapdir1 (inode num: 1002)

If the namespace for the exemplary file system is corrupted, the following steps may be taken to recover the file system namespace, according to method 800. First, a disaster recovery application may iterate through container set and locate all the L6 super segments. Specifically, super segments corresponding to the M-tree/mtree1 are located in the set of file containers. The L6 super segment contains reference file handle and file name and parent base file information. An example super segment data structures may list file attributes for the referenced files within as follows:

```
typedef struct {
    content_info_t info; /*for higher layers, aids reconstruction*/
}cs_super_seg_v0_t;
typedef struct {
    file_handle_t fh;
    uint8_t opaque[OPAQUE_INFO_SIZE]; /*cs_info_t*/
}content_info_t;
typedef struct {
    int64_t inum;
    uint32_t mid;
}file_handle_t;
typedef struct {
    char*parent file name; /*parent base file name*/
    char*file_name; /*base file name*/
}cs_info_t;
```

From the above L6 super segment, an inode leaf file corresponding to/mtree1/File1 may be recreated having the following file attributes:

content_info_t→file_handle_t→inum=1001;
    content_info_t→file_handle_t→mid=10;
    content_info_t→cs_info_t→file_name="File1.txt";
    content_info_t→cs_info_t→parent_file_name="mtree1";

The content handle may be reconstructed as a pointer by also extracting the relevant attributes from the L6 Super segment found for the file:

```
struct content_handle_t {
    seg_ref_t super_ref;
};
```

A reconstructed namespace inode may then be stored in a reconstructed namespace, where the inode includes both the reconstructed content handle and the recreated file attributes listed above. From the content handle, content_info_t→ file_handle_t, the mid and inode number of the file may be extracted. Furthermore, from the content handle, content_info_t→cs_info_t, the name of the file and its parent directory may be extracted:

```
typedef struct {
    fm_inode_t*inode; /*mid, inum and other attrs*/
    content_handle_t ch;
}fm_data_t;
```

This process is then repeated for each inode of the file, and then each directory of the namespace (i.e., subdir1, and snapdir1). The M-trees may then be aggregated into U-trees, and the prime segment may be reconstructed. Finally, the recovered namespace metadata tree data structure may be restored to the local legacy location. The recovered filesystem is substantially identical to the original, preserving the original hierarchy and file names, and is searchable via queries submitted to the file system.

Conventional and existing methods of file system recovery use a generic, non-hierarchical recovery directory like a "lost+found" directory. In such methods, recovered files lose their hierarchy and their names, and are presented via a flat lost+found structure. However, the solution described in method 800 recovers and presents the file system with its original file system format of directories and files, instead of a flat lost+found structure. Moreover, the recovered namespace retains the ability to distinguish snapshots and active content of the file sets, preventing a mingling of files from snapshots and active content that would occur using conventional solutions.

Other conventional techniques for namespace recovery rely on file system checkers. All file systems do provide some level of 'filesystem checker' or briefly 'fsck.' Fsck tools can parse damaged namespaces and attempt to salvage and repair the file system to the extent possible. However, to be able to salvage anything, at least two requirements must be met. First, the data should be intact. Second, the namespace metadata pertaining to such data is at least decipherable. In the case of conventional filesystems, when a corrupting event occurs at the data centers, it is invariable that either one of the data and meta data or both could be damaged to be unreadable, rendering fsck tools unable to recover the file system.

Also, conventional tools of file system recovery like 'fsck' have the ability to validate file metadata and create file entries in lost+found, if it is able to find an inode with inode number that has a file name. However, if inode is corrupted or missing, utility tools like 'fsck' will not be able to recreate the file in lost+found. Snapshots can also come to rescue to restore filesystem. But garbage collector tools may erase snapshots if they have expired.

Even in such disastrous data loss situations, the meta data reconstruction and recovery solution presented above in method 800 helps reconstruct namespace of the file system so that such data can be accessed and avoid data loss. The above recovery solution can be used by any file system, that stores file block map pointers in some a B+ tree/Merkle tree. For example, vxfs and zfs both use B+ trees to store block maps of files contained therein.

Although FIG. 8 depicts the blocks 802-814 occurring in a specific order, the blocks 802-814 may occur in other orders. In other implementations, each of the blocks 802-814 may also be executed concurrently and/or in combination with other blocks and/or some blocks may be divided into a distinct set of blocks.

Exemplary Computing System

Figure 9:
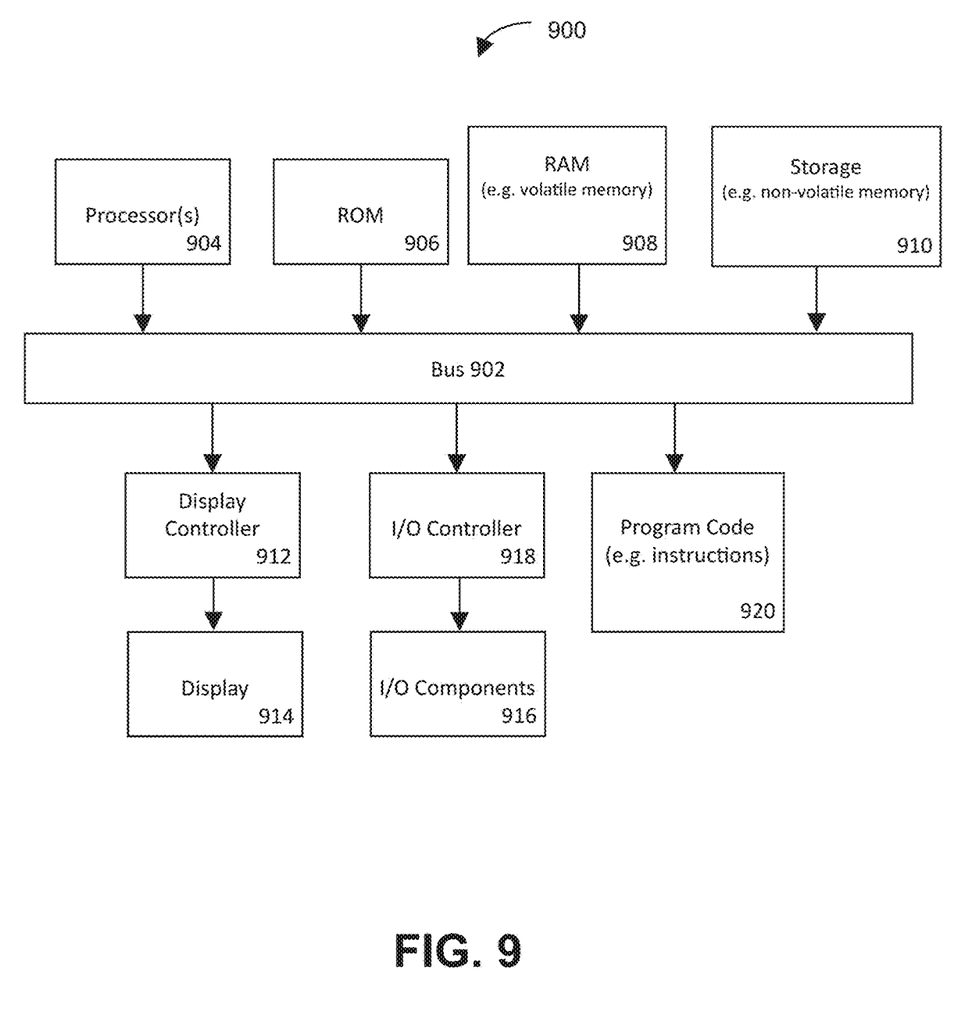
FIG. 9 is a block diagram illustrating a computing system for reconstructing a namespace in response to a loss of data according to one or more embodiments of the disclosure.

FIG. 9 shows a block diagram of an example of a computing system that may be used in conjunction with one or more embodiments of the disclosure. For example, computing system 900 (or system, or server, or computing device, or device) may represent any of the devices or systems described herein that perform any of the processes, operations, or methods of the disclosure. Note that while the computing system 900 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 900 may include a bus 902 which may be coupled to a processor 904, ROM (Read Only Memory) 906, RAM (or volatile memory) 908, and storage (or non-volatile memory) 910. The processor(s) 904 may retrieve stored instructions from one or more of the memories 906, 908, and 910 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 904 may perform operations in an on-demand or "cloud computing" environment or as a service, such as within a "software as a service" (SaaS) implementation. Accordingly, the performance of operations may be distributed among the one or more processors 904, whether residing only within a single machine or deployed across a number of machines. For example, the one or more processors 904 may be located in a single geographic location (such as within a home environment, an office environment, or a server farm), or may be distributed across a number of geographic locations.

The RAM 908 may be implemented as, for example, dynamic RAM (DRAM), or other types of memory that require power continually in order to refresh or maintain the data in the memory. Storage 910 may include, for example, magnetic, semiconductor, tape, optical, removable, non-removable, and other types of storage that maintain data even after power is removed from the system. It should be appreciated that storage 910 may be remote from the system, such as accessible via a network.

A display controller 912 may be coupled to the bus 902 in order to receive display data to be displayed on a display device 914, which can display any one of the user interface features or embodiments described herein and may be a local or a remote display device. The computing system 900 may also include one or more input/output (I/O) components 916 including mice, keyboards, touch screen, network interfaces, printers, speakers, and other devices. Typically, the input/output components 916 are coupled to the system through an input/output controller 918.

Program code 920 may represent any of the instructions, applications, software, libraries, toolkits, modules, components, engines, units, functions, logic, etc. as described herein. Program code 920 may reside, completely or at least partially, within the memories described herein (such as non-transitory computer-readable media), or within a processor during execution thereof by the computing system. Program code 920 may include both machine code, such as produced by a compiler, and files containing higher-level or intermediate code that may be executed by a computing system or other data processing apparatus (or machine) using an interpreter. In addition, program code 920 may be implemented as software, firmware, or functional circuitry within the computing system, or as combinations thereof. Program code 920 may also be downloaded, in whole or in part, through the use of a software development kit or toolkit that enables the creation and implementation of the described embodiments.

Moreover, any of the disclosed embodiments may be embodied in distinct types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for source namespace recovery comprising:
   one or more processors; and
   a non-transitory computer readable medium storing a plurality of instructions, which when executed, cause the one or more processors to:
   locate, by a disaster recovery application, metadata super segments within a set of file containers in response to a determination that original namespace metadata associated with files stored within the containers is at least partially unreadable, each super segment being a hash of lower-level segments stored in the set of file containers;
   reconstruct, by the disaster recovery application, content handles linking the super segments to metadata for each of the files referenced by the super segments;
   extract, by the disaster recover application, both inode numbers and M-tree identifiers from the super segments for each of the files referenced by the super segments;
   assemble, by the disaster recovery application, a plurality of U-trees by aggregating and linking the inode numbers of the files referenced within the super segments based on the M-tree identifiers; and
   assemble a recovered namespace metadata tree data structure for all of the files within the plurality of LP containers by aggregating and linking the generated plurality of U-trees, the recovered namespace metadata tree data structure having an identical hierarchical structure to the original namespace metadata.

2. The system of claim 1, wherein the super segments are only found in a subset of the plurality of LP containers.

3. The system of claim 1, the content handles each comprising a pointer linking a reconstructed inode entry in the namespace metadata for a file to a corresponding super segment in the data containers.

4. The system of claim 1, wherein the plurality of instructions further causes the processor to receive a request for a file stored within the plurality of containers, retrieve the requested file using the recovered namespace metadata tree data structure, and transmit the requested file to the requesting system.

5. The system of claim 1, wherein the plurality of instructions further causes the processor to apply predetermined hashing rules as part of the assembling the plurality of the U-trees, where metadata files for each file and directory have corresponding hashes.

6. The system of claim 1, the super segments being hashes of a plurality of lower-level data segments that make up files stored within the containers.

7. The system of claim 1, the super segment being an L6 segment.

8. A computer program product comprising a non-transitory computer-readable medium having a computer-readable program code embodied therein to be executed by one or more processors, the program code including instructions to:
locate, by a disaster recovery application, metadata super segments within a set of file containers in response to a determination that original namespace metadata associated with files stored within the containers is at least partially unreadable, each super segment being a hash of lower-level segments stored in the set of file containers;
reconstruct, by the disaster recovery application, content handles linking the super segments to metadata for each of the files referenced by the super segments;
extract, by the disaster recover application, both inode numbers and M-tree identifiers from the super segments for each of the files referenced by the super segments;
assemble, by the disaster recovery application, a plurality of U-trees by aggregating and linking the inode numbers of the files referenced within the super segments based on the M-tree identifiers; and
assemble a recovered namespace metadata tree data structure for all of the files within the plurality of LP containers by aggregating and linking the generated plurality of U-trees, the recovered namespace metadata tree data structure having an identical hierarchical structure to the original namespace metadata.

9. The computer program product of claim 8, wherein the super segments are only found in a subset of the plurality of LP containers.

10. The computer program product of claim 8, the content handles each comprising a pointer linking a reconstructed inode entry in the namespace metadata for a file to a corresponding super segment in the data containers.

11. The computer program product of claim 8, wherein the program code includes further instructions to receive a request for a file stored within the plurality of containers, retrieve the requested file using the recovered namespace tree data structure, and transmit the requested file to the requesting system.

12. The computer program product of claim 8, wherein the program code includes further instructions to apply predetermined hashing rules as part of the assembling the plurality of the U-trees, where metadata files for each file and directory have corresponding hashes.

13. The computer program product of claim 8, the super segments being hashes of a plurality of lower-level data segments that make up files stored within the containers.

14. The computer program product of claim 8, the super segment being an L6 segment.

15. A computer-implemented method for source namespace and file copying comprising:
locating, by a disaster recovery application, metadata super segments within a set of file containers in response to a determination that original namespace metadata associated with files stored within the containers is at least partially unreadable, each super segment being a hash of lower-level segments stored in the set of file containers;
reconstructing, by the disaster recovery application, content handles linking the super segments to metadata for each of the files referenced within the super segments;
extracting, by the disaster recover application, both inode numbers and M-tree identifiers from the super segments for each of the files referenced by the super segments;
assembling, by the disaster recovery application, a plurality of U-trees by aggregating and linking the inode numbers of the files referenced within the super segments based on the M-tree identifiers; and
assembling a recovered namespace metadata tree data structure for all of the files within the plurality of LP containers by aggregating and linking the generated plurality of U-trees, the recovered namespace metadata tree data structure having an identical hierarchical structure to the original namespace metadata.

16. The computer-implemented method of claim 15, wherein the super segments are only found in a subset of the plurality of LP containers.

17. The computer-implemented method of claim 15, the content handles each comprising a pointer linking a reconstructed inode entry in the namespace metadata for a file to a corresponding super segment in the data containers.

18. The computer-implemented method of claim 15, wherein the computer-implemented method further comprises receiving a request for a file stored within the plurality of containers, retrieving the requested file using the recovered namespace metadata tree data structure, and transmitting the requested file to the requesting system.

19. The computer-implemented method of claim 15, wherein the computer-implemented method further comprises applying predetermined hashing rules as part of the assembling the plurality of the U-trees, where metadata files for each file and directory have corresponding hashes.

20. The computer-implemented method of claim 15, the super segment being an L6 segment.

\* \* \* \* \*